(12) United States Patent
Lortz (10) Patent No.: US 8,880,877 B2
(45) Date of Patent: Nov. 4, 2014

(54) METHOD FOR ASSEMBLING AUTHORIZATION CERTIFICATE CHAINS

(75) Inventor: Victor B. Lortz, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/334,367

(22) Filed: Dec. 22, 2011

(65) Prior Publication Data

US 2012/0096522 A1    Apr. 19, 2012

Related U.S. Application Data

(60) Division of application No. 12/504,009, filed on Jul. 16, 2009, now Pat. No. 8,769,266, which is a continuation of application No. 10/022,592, filed on Dec. 13, 2001, now Pat. No. 7,571,314.

(51) Int. Cl.
*H04L 9/32* (2006.01)
*H04L 29/06* (2006.01)

(52) U.S. Cl.
CPC .......... *H04L 63/0823* (2013.01); *H04L 9/3265* (2013.01); *H04L 9/321* (2013.01); *H04L 2209/60* (2013.01); *H04L 63/0884* (2013.01); *H04L 2209/68* (2013.01); *H04L 63/0428* (2013.01); *H04L 2463/102* (2013.01)
USPC .............................. 713/157; 713/175; 726/10

(58) Field of Classification Search
CPC . H04L 63/0823; H04L 63/08; H04L 63/0884; H04L 9/32; H04L 9/3263; H04L 9/3265; H04L 9/3268; H04L 2209/38; G06F 21/33; G06F 21/31; G06F 21/30
USPC .................. 713/155–158, 175; 709/229, 219; 726/3–5, 10
See application file for complete search history.

(56) References Cited

U.S. PATENT DOCUMENTS 6,138,235 A * 10/2000 Lipkin et al. .................. 713/155
6,367,009 B1    4/2002 Davis et al.
(Continued)

FOREIGN PATENT DOCUMENTS

GB          2357225      6/2001
WO    WO-02054808 A1    7/2002

OTHER PUBLICATIONS

U.S. Appl. No. 10/022,592, Advisory Action mailed Jun. 26, 2007, 3 pgs.
(Continued)

*Primary Examiner* — Zachary A Davis
(74) *Attorney, Agent, or Firm* — Schwegman Lundberg & Woessner, P.A.

(57) ABSTRACT

A method for assembling authorization certificate chains among an authorizer, a client, and a third party allows the client to retain control over third party access. The client stores a first certificate from the authorizer providing access to a protected resource and delegates some or all of the privileges in the first certificate to the third party in a second certificate. The client stores a universal resource identifier (URI) associated with both the first certificate and the third party and provides the second certificate and the URI to the third party. The third party requests access to the protected resource by providing the second certificate and the URI, without knowledge or possession of the first certificate. When the authorizer accesses the URI, the client provides the first certificate to the authorizer, so that the client retains control over the third party's access.

20 Claims, 7 Drawing Sheets

(56) References Cited

U.S. PATENT DOCUMENTS

| | | | |
|---|---|---|---|
| 6,643,774 B1 * | 11/2003 | McGarvey | 713/155 |
| 6,763,459 B1 | 7/2004 | Corella | |
| 7,237,107 B2 | 6/2007 | Wray | |
| 7,313,692 B2 | 12/2007 | Weeks et al. | |
| 7,340,601 B2 | 3/2008 | Wray | |
| 7,395,550 B2 | 7/2008 | Weeks et al. | |
| 7,418,256 B2 | 8/2008 | Kåll et al. | |
| 7,500,104 B2 | 3/2009 | Goland | |
| 7,571,314 B2 | 8/2009 | Lortz | |
| 7,904,722 B2 | 3/2011 | Sudia et al. | |
| 2009/0282242 A1 | 11/2009 | Lortz | |

OTHER PUBLICATIONS

U.S. Appl. No. 10/022,592, Advisory Action mailed Jun. 30, 2008, 3 pgs.

U.S. Appl. No. 10/022,592, Advisory Action mailed Jul. 24, 2006, 3 pgs.

U.S. Appl. No. 10/022,592, Final Office Action mailed Mar. 17, 2008, 13 pgs.

U.S. Appl. No. 10/022,592, Final Office Action mailed Apr. 5, 2007, 15 pgs.

U.S. Appl. No. 10/022,592, Final Office Action mailed Apr. 7, 2006, 15 pgs.

U.S. Appl. No. 10/022,592, Non Final Office Action mailed Sep. 18, 2007, 13 pgs.

U.S. Appl. No. 10/022,592, Non-Final Office Action mailed Jul. 14, 2005, 12 pgs.

U.S. Appl. No. 10/022,592, Non-Final Office Action mailed Sep. 25, 2008, 13 pgs.

U.S. Appl. No. 10/022,592, Non-Final Office Action mailed Oct. 19, 2006, 15 pgs.

U.S. Appl. No. 10/022,592, Notice of Allowance mailed Apr. 3, 2009, 12 pgs.

U.S. Appl. No. 10/022,592, Response filed Jan. 17, 2006 Non-Final Office Action mailed Jul. 14, 2005, 11 pgs.

U.S. Appl. No. 10/022,592, Response filed Jan. 19, 2007 to Non-Final Office Action mailed Oct. 19, 2006, 7 pgs.

U.S. Appl. No. 10/022,592, Response filed Jun. 5, 2007 to Final Office Action mailed Apr. 5, 2007, 2 pgs.

U.S. Appl. No. 10/022,592, Response filed Jun. 17, 2008 to Final Office Action mailed Mar. 17, 2008, 7 pgs.

U.S. Appl. No. 10/022,592, Response filed Jul. 7, 2006 to Final Office Action mailed Apr. 7, 2006, 11 pgs.

U.S. Appl. No. 10/022,592, Response filed Jul. 9, 2007 to Advisory Action mailed Jun. 26, 2007, 10 pgs.

U.S. Appl. No. 10/022,592, Response filed Aug. 7, 2006 to Advisory Action mailed Jul. 24, 2006, 11 pgs.

U.S. Appl. No. 10/022,592, Response filed Dec. 18, 2007 to Non-Final Office Action mailed Sep. 18, 2007, 8 pgs.

U.S. Appl. No. 10/022,592, Response filed Dec. 23, 2008 to Non-Final Office Action mailed Sep. 25, 2008, 8 pgs.

U.S. Appl. No. 12/504,009, Final Office Action mailed Aug. 30, 2011, 12 pgs.

U.S. Appl. No. 12/504,009, Non Final Office Action mailed Feb. 8, 2011, 22 pgs.

U.S. Appl. No. 12/504,009, Response filed Jun. 7, 2011 to Non Final Office Action mailed Feb. 8, 2011, 9 pgs.

U.S. Appl. No. 12/504,009, Response filed Nov. 24, 2010 to Restriction Requirement mailed Oct. 27, 2010, 6 pgs.

U.S. Appl. No. 12/504,009, Response filed Nov. 30, 2011 to Final Office Action mailed Aug. 30, 2011, 8 pgs.

U.S. Appl. No. 12/504,009, Restriction Requirement mailed Oct. 27, 2010, 6 pgs.

Aura, T., "On the Structure of Delegation Networks", Helskinki University of Technology Digital Systems Laboratory, Series A: Research Reports. No. 48, (Dec. 1997), 56 pgs.

Aura, T., "On the Structure of Delegation Networks", Proceedings of the 11th IEEE Computer Security Foundations Workshop, (Jun. 9, 1998), 13 pgs.

Brown, Allen, et al., "SOAP Security Extensions: Digital Signature", WC3 Note, Feb. 6, 2001, 1-8.

Eastlake, Donald, et al., "XML-Signature Syntax and Processing", W3C Candidate Recommendation, 2000, , 1-60.

Ellison, Carl, et al., "SPKI Certificate Theory", IETF RFC 2693, 1999, , 1-41.

Kagal, Lalana, et al., "Trust-Based Security in Pervasive Computing Environments", Computer, Dec. 2001, , 154-157.

U.S. Appl. No. 12/504,009, Examiner Interview Summary mailed May 16, 2013, 4 pgs.

U.S. Appl. No. 12/504,009, Final Office Action mailed Apr. 1, 2013, 12 pgs.

U.S. Appl. No. 12/504,009, Non Final Office Action mailed Sep. 25, 2012, 11 pgs.

U.S. Appl. No. 12/504,009, Response filed Dec. 21, 2012 to Non Final Office Action mailed Sep. 25, 2012, 7 pgs.

U.S. Appl. No. 12/504,009 , Response filed Jun. 3, 2013 to Final Office Action mailed Apr. 1, 2013, 14 pgs.

U.S. Appl. No. 12/504,009, Non Final Office Action mailed Aug. 28, 2013, 12 pgs.

U.S. Appl. No. 12/504,009, Response filed Jun. 20, 2013 to Advisory Action mailed Jun. 19, 2013, 14 pgs.

U.S. Appl. No. 12/504,009, Response filed Nov. 26, 2013 to Non Final Office Action mailed Aug. 28, 2013, 9 pgs.

U.S. Appl. No. 12/504,009, Notice of Allowance mailed Feb. 19, 2014, 13 pgs.

* cited by examiner

METHOD FOR ASSEMBLING AUTHORIZATION CERTIFICATE CHAINS

This application is a divisional of U.S. patent application Ser. No. 12/504,009, which is a continuation of U.S. patent application Ser. No. 10/022,592, filed on Dec. 31, 2001, now issued as U.S. Pat. No. 7,571,314, all of which are incorporated herein by reference in their entirety.

BACKGROUND

Computer security provides confidentiality, authentication, integrity, and non-repudiation. Confidentiality prevents an eavesdropper from reading a message. Authentication prevents an intruder from masquerading as the originator of a message. Integrity prevents an intruder from modifying a message in transit or substituting a false message for a legitimate one. Non-repudiation prevents a sender from falsely denying later that he sent a message.

Figure 1:
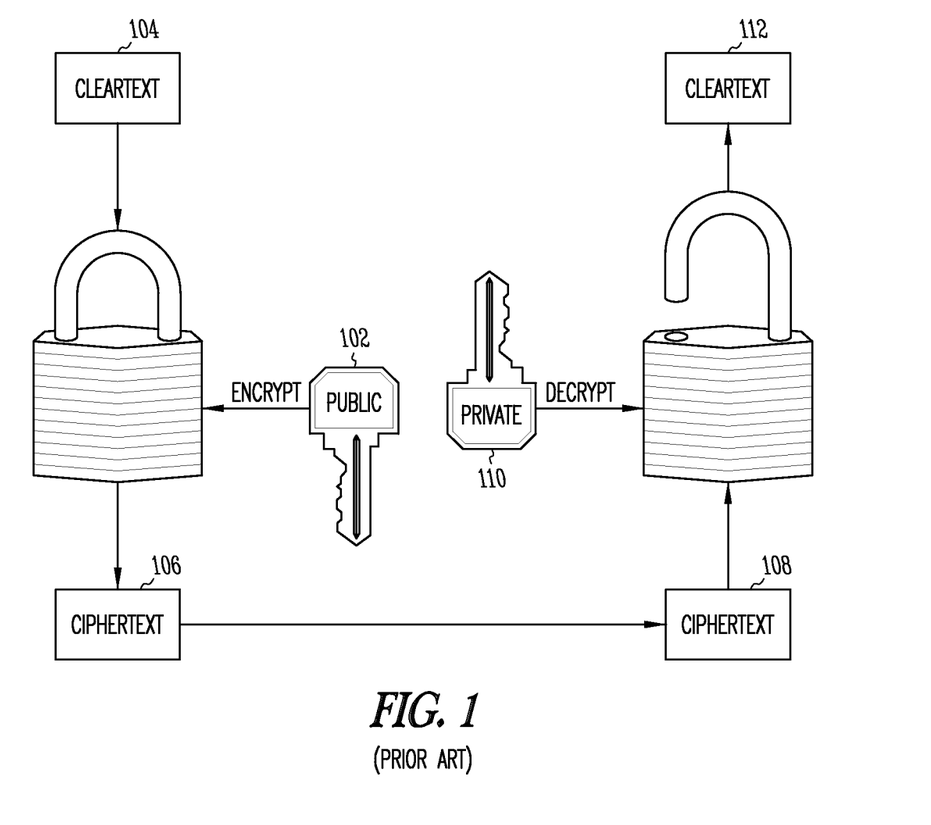
FIG. 1 is a block diagram of a typical encryption method in the prior art.

Encrypting a message is one way to ensure confidentiality. FIG. 1 is a block diagram of a typical encryption method in the prior art. Suppose Alice wants to send a confidential message to Bob. First, Bob sends Alice his public key 102. Then, Alice creates a cleartext 104 (an unencrypted message) encrypts it using Bob's public key 102, and sends the resulting ciphertext 106 to Bob. Next, Bob decrypts the ciphertext 108 with his private key 110, enabling him to read the cleartext 112. Eve, an eavesdropper, is unable to read the ciphertext 106 during transit and cannot decrypt it with the public key, so it is confidential. Suppose, however, when Bob initially sent his public key 102 to Alice, Eve intercepted Bob's public key 102 and substituted her own public key. Alice—thinking she had Bob's public key—encrypted the message and sent it to Bob. Eve intercepted again and decrypted the ciphertext 106 and read the cleartext 112. Even worse, Eve then substituted different cleartext using Bob's public key and Bob thought it came from Alice. How can Bob tell if the message came from Alice? Bob can tell by authenticating with an identity certificate.

Figure 2A:
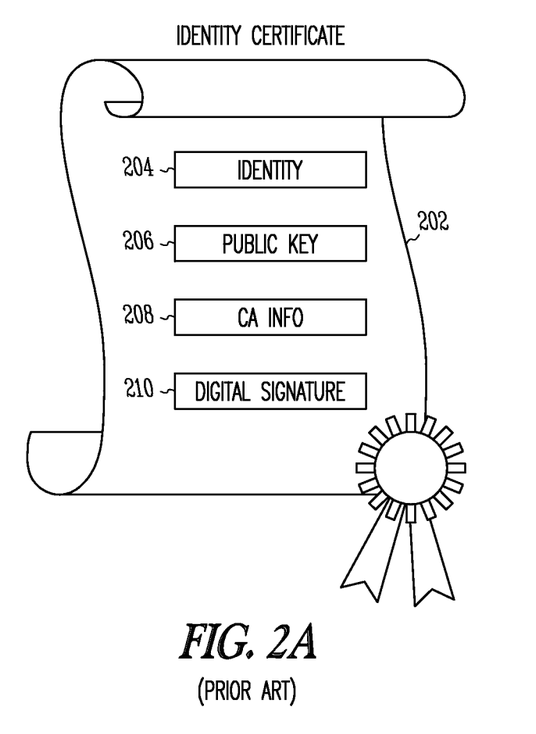
FIG. 2A is a block diagram of an identity certificate in the prior art.

FIG. 2A is a block diagram of an identity certificate 202 in the prior art. The identity certificate 202 associates an identity 204 with a public key 206 to ensure the public key 206 belongs to the identity 204. Identity certificates 202 contain information from a Certification Authority (CA) 208 and a digital signature 210. The digital signature 210 is proof of authorship by the person identified in the identity 204. If Bob digitally signs 210 an identity certificate 202 through a CA, who verifies his identity, Eve is thwarted from substituting her public key 102 for Bob's. This is because Alice verifies Bob's public key 102 using his identity certificate 202, before encrypting the cleartext 104. Thus, the identity certificate 202 provides authentication. It also ensures integrity and non-repudiation.

However, identity certificates 202 have significant drawbacks in certain practical situations. Suppose E-Commerce Inc. forms a business relationship with Major Corporation. Later, E-Commerce outsources one aspect of its business to Fly-By-Night Consulting Ltd. Major issues identity certificates to E-Commerce providing E-Commerce secure access to protected resources, including a customer database. In turn, E-Commerce issues identity certificates to Fly-By-Night and gives Fly-By-Night a copy of its identity certificate from Major. In order for Fly-By-Night to use the identity certificates issued by E-Commerce to access Major's customer database, Fly-By-Night needs a copy of the identity certificate issued from Major to E-Commerce to complete the identity certificate chain. In short, Fly-By-Night must present both its identity certificate and E-Commerce's identity certificate to Major to access the customer database. Major decides whether or not to allow access to Fly-By-Night based on additional information, such as a mapping of certificate identities to permissions. But, this is a burden for Major to maintain. Thus, Major is tempted to take shortcuts like accepting all certificates signed by E-Commerce. There is a need for a new way to assemble certificate chains so that E-Commerce retains more control over Fly-By-Night's access to Major's resources.

Sharing full security information with a subcontractor is an unacceptable risk, because there is no long-term trust relationship. E-Commerce needs a more secure method for Fly-By-Night to communicate its privileges to Major, one that preserves the trust relationship with Major. Trust is essential to doing business, especially over the Internet.

On the Internet, distributed services traditionally have been based on Remote Procedure Call (RPC), such as Distributed Component Object Model (DCOM) and Common Object Request Broker Architecture (CORBA). These used network security mechanisms that are not valid across domains, such as Windows NT login domain. Also, firewalls routinely block RPC connections, because of the security threat they represent. A firewall is a system that prevents access to or from a private computer network. Web services attempted to finesse these problems with Hypertext Transfer Protocol (HTTP) connections not blocked by firewalls. However, this attempt did not solve the underlying issue of establishing cross-domain trust and authorization.

On the contrary, web services potentially open up huge security risks. These risks are not adequately addressed by current security mechanisms. For example, these risks are not adequately addressed by web services defined as Extensible Markup Language (XML) based Simple Object Access Protocol (SOAP) interfaces. SOAP interfaces are associated with Universal Resource Identifiers (URIs) that are accessible via HyperText Transfer Protocol (HTTP). XML defines standard formats for sharing information. To add authentication to SOAP packets, SOAP communications can be signed using XML digital signatures. The XML digital signature specification defines a standard way to transmit digital certificates for both conventional X.509 identity certificates and for new Simple Public Key Infrastructure (SPKI) authorization certificates. X.509 and SPKI are standards for defining digital certificates. Unfortunately, little attention has been given to the new SPKI authorization certificates. New methods should take advantage of the new SPKI authorization certificates, because the conventional X.509 identity certificates have significant practical drawbacks. Web services need new security mechanisms that directly address the underlying issue of establishing cross-domain trust and authorization. For example, E-Commerce needs to establish cross-domain trust and authorization with both Fly-By-Night and Major.

Instead of turning over its identity certificate to Fly-By-Night, E-Commerce should have delegated restricted or limited privileges to Fly-By-Night in order to protect Major's protected resources. Identity certificates 202 do not permit delegation, restrictions, or limitations. Also, E-Commerce shouldn't have to tell Major about the outsourcing. Subcontractors frequently change. Tracking and updating the identity certificates of subcontractors creates a nuisance of overhead expenses for Major. Yet, identity certificates 202 require the identity 204 of subcontractors like Fly-By-Night to be known, tracked, and updated by Major. E-Commerce needs a better method of authorizing a certificate for Fly-By-Night, one that allows E-Commerce more control over communication between Fly-By-Night and Major. E-Commerce and other organizations need certificates capable of delegating limited privileges to a third party, without revealing the identity 204 of the third party, while still providing confidentiality, authentication, integrity, and non-repudiation.

DETAILED DESCRIPTION

Methods for assembling authorization certificate chains and associated data signals are described. In the following detailed description, reference is made to the accompanying drawings, which form a part hereof. These drawings show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be used and structural, logical, and electrical changes may be made without departing from the scope of the present invention.

Figure 2B:
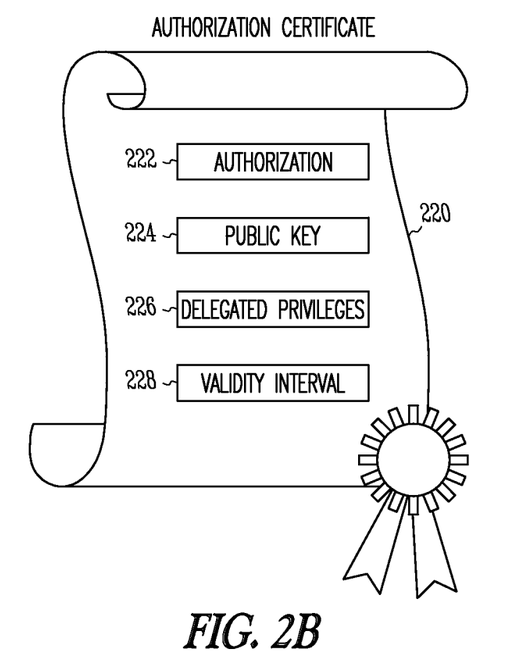
FIG. 2B is a block diagram of an authorization certificate to be contrasted with the identity certificate shown in FIG. 2A.

FIG. 2B is a block diagram of an authorization certificate 220 to be contrasted with the identity certificate 202 shown in FIG. 2A. The identity certificate 202 shown in FIG. 2A associates an identity 204 with a public key 206, while the authorization certificate 220 shown in FIG. 2B associates an authorization 222 with a public key 224. Thus, an authorization certificate 220 issued to a third party does not reveal the identity of the third party. The authorization certificate 220 also contains delegated privileges 226 and a validity interval 228. Delegated privileges 226 may include conditions, limitations, and restrictions on those privileges, including scope, time, and context. The validity interval 228 defines if and when the authorization certificate is valid.

Traditional identity certificates 202 have significant drawbacks, while authorization certificates 220 are capable of delegating limited privileges to a third party, without revealing the identity 204 of the third party, while still providing confidentiality, authentication, integrity, and non-repudiation. Traditional identity certificates 202 are implemented according to the X.509 standard, while authorization certificates 220 are implemented according to the SPKI standard. SPKI certificates can directly encode authorizations, while X.509 certificates merely bind public keys to identities. Software applications must subsequently interpret X.509 identities to make authorization decisions using mechanisms subject to additional security risk, such as compromising a database mapping certificate identities to login account names. SPKI certificates also support constrained delegation of authority.

The delegation features of SPKI certificates enable certificate issuers to specify whether the entity to which an authorization certificate is issued is capable of empowering other keys to obtain the same or more limited authorization. These features enable web service providers to use subcontractors to perform specific aspects of the service on behalf of the client without the client needing to know of or issue credentials to the subcontractors. Interestingly, many of the scenarios used to describe and motivate the use of web services describe the same "service is a client of other services" model. However, the trust and security issues that arise in this context are an open issue. For example, suppose a client authorizes a service to access one of its own protected resources, e.g. a client-side database by agreeing on a shared secret or digital certificate value. Current web service proposals have no good way for the service to delegate access to subcontractors. Divulging the shared secret or other credential to a subcontractor is unacceptable, because there is often no long-term trust relationship with the subcontractor. SPKI certificates provide an elegant and robust solution to this open issue.

Returning to the Fly-By-Night scenario in the background, suppose E-Commerce issued an authorization certificate 220 to Fly-By-Night instead of an identity certificate 202. Fly-By-Night no longer has direct access to the certificate issued from Major to E-Commerce. In addition, E-Commerce has increased control over Fly-By-Night's use of the delegated privileges 226 through conditions, limitations, and restrictions and the validity interval 228.

Figure 3:
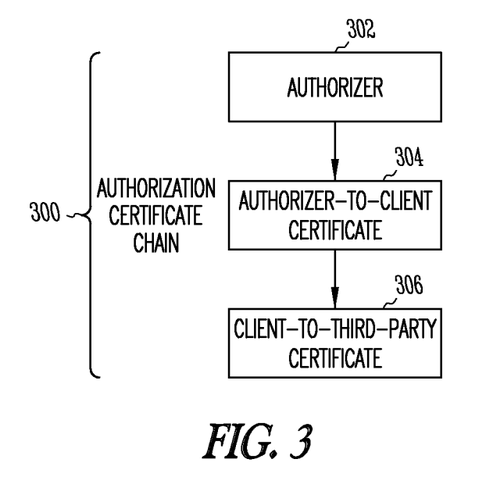
FIG. 3 is a block diagram of an authorization certificate chain.

FIG. 3 is a block diagram of an authorization certificate chain 300. An authorizer is an entity that makes an authorization decision based on a key used to sign a certificate that is recognized, known, and trusted by the authorizer. Any holder of an SPKI certificate can act as an authorizer. An authorization certificate chain 300 is a sequence of one or more certificates issued by a holder of authorized keys. The chain conveys the authorization where the root key is trusted by prior knowledge. For example, Major has a root key stored on a secure computer system used in creating certificates. In the Fly-By-Night scenario, Major is the authorizer and signer of an authorizer-to-client certificate 304 and E-Commerce signs the client-to-third-party certificate 306.

FIG. 3 shows a certificate chain 300 from an authorizer 302 to an authorizer-to-client certificate 304 to a client-to-third party certificate 306. In the Fly-By-Night scenario, the authorizer 302 is Major, the authorizer-to-client certificate 304 is the certificate issued from Major to E-Commerce, and the client-to-third party certificate 306 is the certificate issued from E-Commerce to Fly-By-Night. When Fly-By-Night exercises the privileges in the client-to-third party certificate 306, E-Commerce is notified to control the access and to provide the authorizer-to-client certificate 304. Thus, Fly-By-Night never has knowledge of the authorizer-to-client certificate 304, keeping E-Commerce in the loop. In addition, E-Commerce is in the loop so that it can reconsider the access at the time it is being exercised and, if necessary, revoke the privilege. For example, E-Commerce might revoke a privilege if Fly-By-Night was no longer doing business with E-Commerce or if other circumstances had changed.

For example, SOAP requests for web services are augmented with XML signatures containing SPKI certificates in the SOAP headers. These certificates authenticate and authorize the SOAP request to perform some operation on the service. So far, this is just the standard usage model for signed XML with SPKI certificates. However, in some cases multiple SPKI certificates may be needed to complete the authorization. This situation arises whenever SPKI delegation is used. With SPKI delegation, the authorizer signs a delegation-enabled certificate empowering a client to perform some operation and the client signs another certificate empowering a third party to perform the same or a more limited operation. For the third party to demonstrate its right to perform the operation, both certificates must be submitted to the authorizer. In the traditional model, the third party will have both certificates in its possession and will include both of them in its SOAP request. The present invention describes an alternative model where the original SOAP request does not contain all the needed certificates.

In the present invention, the third party's certificate by itself is insufficient to obtain the privileges granted by the client. However, when the two certificates, the certificate issued from the authorizer to the client and the certificate issued from the client to third party, are combined, the third party is granted the privileges. In the present invention, the certificates are combined in a new way. Conventionally, the authorizer maintains copies of the certificates issued to the client. But, this is undesirable for two reasons. First, it creates additional maintenance overhead for the authorizer. Second, it prevents the client from imposing additional constraints on the third party's use of the delegation authorization.

Unlike X.509 identity certificates, SPKI authorization certificates do not need CAs and do not require Certificate Revocation Lists (CRLs). A CRL is a mechanism that a CA uses to publish and disseminate information about revoked certificates to certificate-issuers. A CRL is analogous to a list of bad checking accounts maintained by a grocery store. Maintaining and publishing notices of revoked certificates is widely acknowledged to be expensive and problematic. One aspect of the present invention is a method where an intermediary, e.g. a client, issues a long-lived SPKI authorization certificate to a third party so that the validity of the certificate and corresponding potential for harm is implicitly limited by the subsequent involvement of the intermediary in the certificate processing. This increases security in cases where services are outsourced across organizational boundaries where trust relationships are less stable than in traditional business models.

Figure 4A:
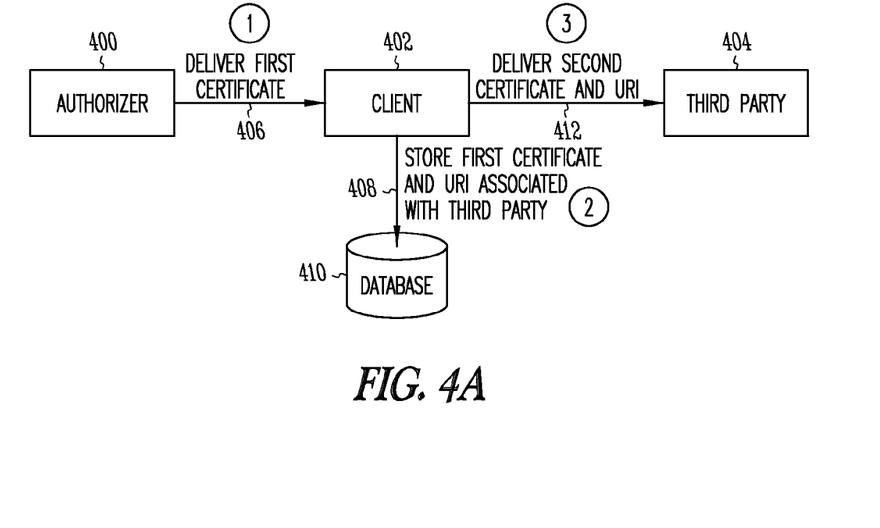
FIGS. 4A and 4B are block diagrams that together show a method embodiment of the present invention for assembling authorization certificate chains among an authorizer, a client, and a third party.
Figure 4B:
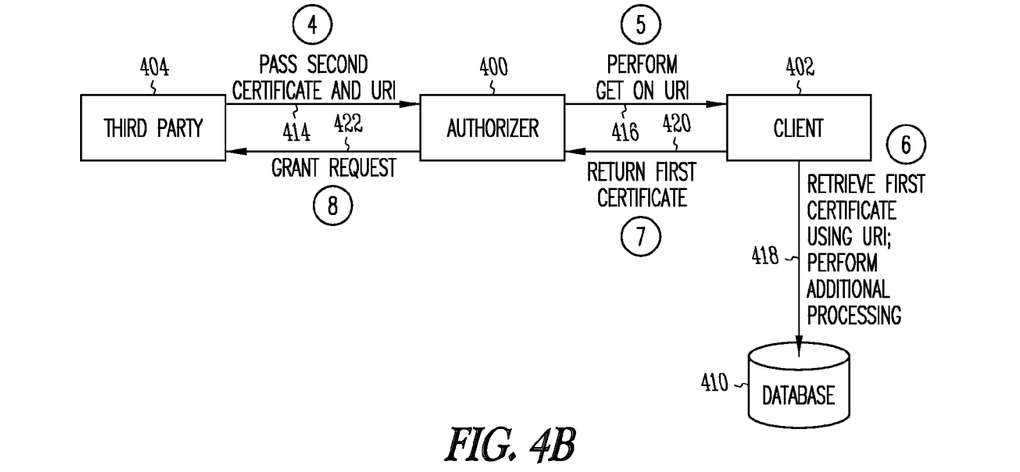

FIGS. 4A and 4B are block diagrams that together show a method embodiment of the present invention for assembling authorization certificate chains among an authorizer 400, a client 402, and a third party 404. FIG. 4A shows how the certificates are initially setup. First, an authorizer 400 delivers 406 a first certificate to a client 402. For example, Major delivers a first certificate to E-Commerce. Then, the client 402 stores 408 the first certificate and a Universal Resource Indicator (URI) that is associated with a third party 404 in a database 410. Next, the client 402 delivers 412 a second certificate and the URI to the third party 404.

FIG. 4B shows what happens when the third party 404 requests access to a protected resource using the second certificate. The third party 404 passes 414 the second certificate and URI to the authorizer 400. Next, the authorizer 400 performs an HTTP "Get" 416 on the URI. Then, the client 402 retrieves 418 the first certificate using the URI and performs additional processing. As a result, the client returns 420 the first certificate to the authorizer 400. Finally, the authorizer 400 grants the request 422.

Figure 5:
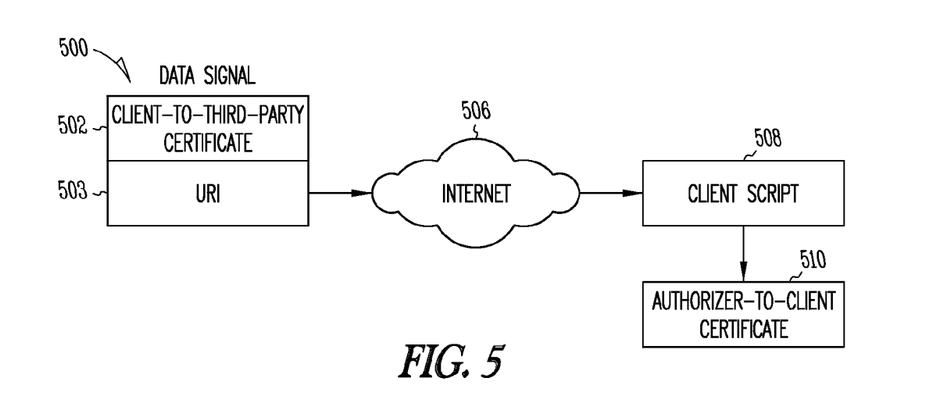
FIG. 5 is a block diagram of a data signal embodiment of the present invention that is sent from a client to a third party.

FIG. 5 is a block diagram of a data signal embodiment of the present invention that is sent from a client to a third party. One aspect of the present invention is a data signal 500 sent from a client to a third party. The data signal comprises a second digital certificate issued from the client to the third party 502 and a URI 503. The URI is capable of retrieving a first digital certificate from a database associated with the client, wherein the first digital certificate issued from an authorizer to the client. FIG. 5 shows an example where the URI 503 uses the Internet 506 to execute a client script 508 to retrieve an authorizer-to-client certificate 510. The client script is an Active Server Page (ASP) or a Common Gateway Interface (CGI) program or some other code executable over the Internet. In one embodiment, the second digital certificate grants less power than the first digital certificate. In another embodiment, the first and second digital certificates are SPKI certificates. SPKI certificates are examples of the type of certificate capable of performing the method of the present invention and other kinds of digital certificates having cryptographic techniques capable of expressing the methods of the present invention also work.

Figure 6:
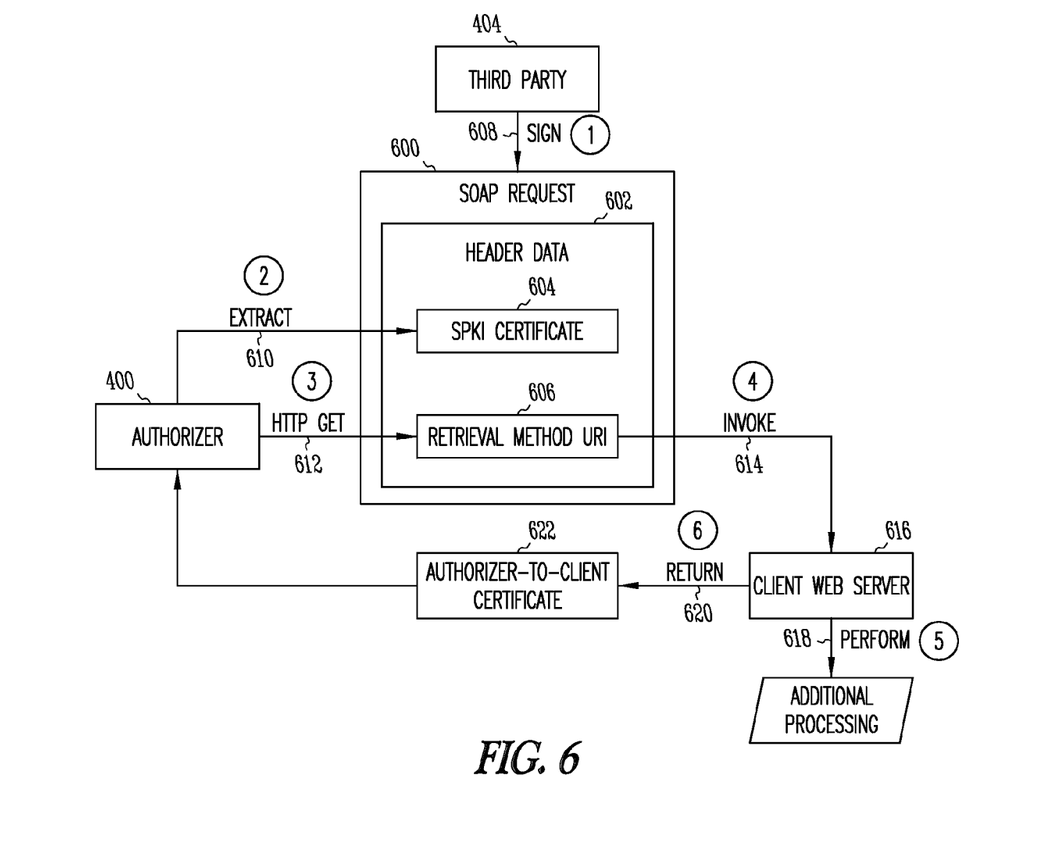
FIG. 6 is a block diagram of an example embodiment of the data signal shown in FIG. 5 as a Simple Object. Access Protocol (SOAP) request and an example method of using it.

FIG. 6 is a block diagram of an example embodiment of the data signal shown in FIG. 5 as a Simple Object Access Protocol (SOAP) request 600 and an example method of using it. The SOAP Request 600 comprises header data 602 that comprises an SPKI certificate 604 and a Retrieval Method including a URI 606. First, the third party 404 signs 608 the SOAP request and sends it to the authorizer 400. The authorizer 400 extracts 610 the SPKI certificate from the SOAP request and performs an HTTP "Get" 612 on the URI. The URI invokes 614 a client web server 616 that performs additional processing 618 and returns 620 a certificate 622 issued by the authorizer to the client.

Figure 7:
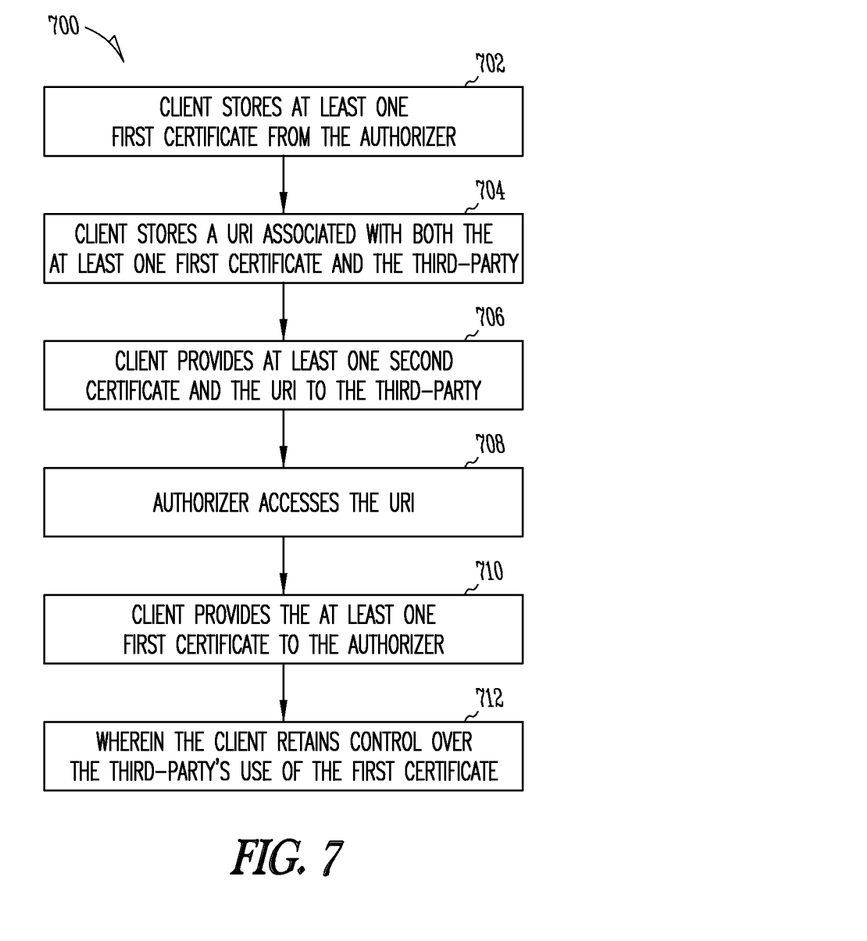
FIGS. 7 and 8 are flow charts of additional method embodiments of the present invention for assembling authorization certificate chains among an authorizer, a client, and a third party.
Figure 8:
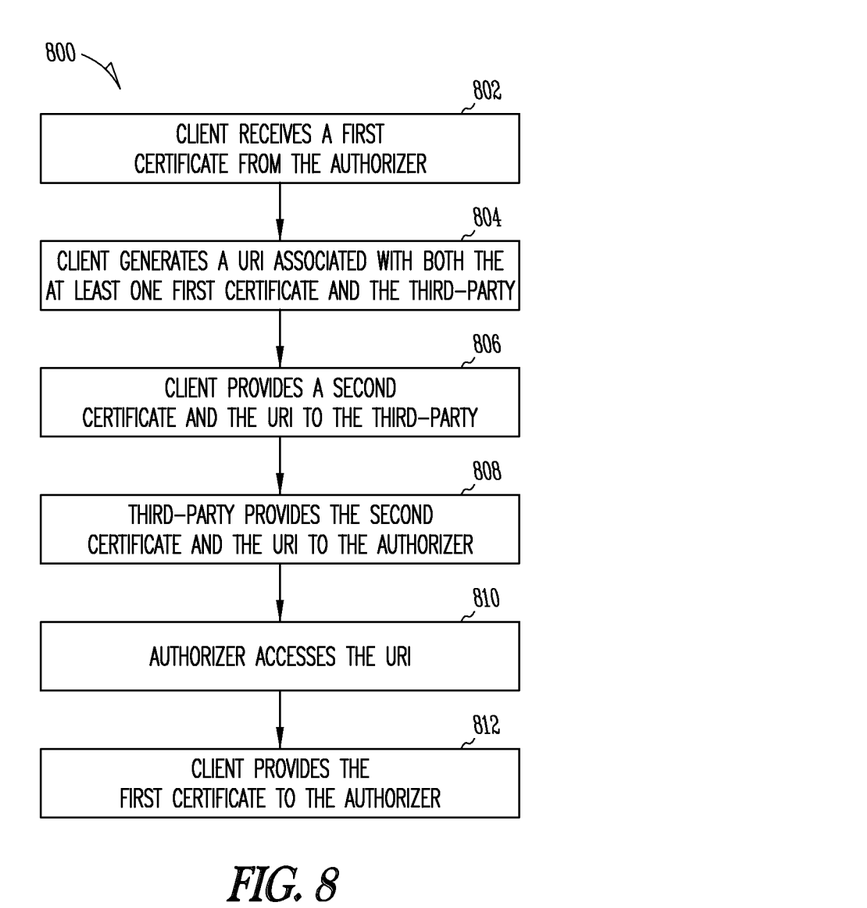

FIGS. 7 and 8 are flow charts of additional method embodiments 700, 800 of the present invention for assembling authorization certificate chains among an authorizer, a client, and a third party. As shown in FIG. 7, one aspect of the present invention is a method for assembling authorization certificate chains among an authorizer, a client, and a third party 700. First, the client stores at least one first certificate from the authorizer 702. Also, the client stores a URI associated with both the at least one first certificate and the third party 704. Then, the client provides at least one second certificate and the URI to the third party 706. When the authorizer accesses the URI 708, the client provides the at least one first certificate to the authorizer 710, so that the client retains control over the third party's use of the first certificate 712.

In one embodiment, the client provides a third certificate with a short-term usage to the third party, upon demand by the authorizer. In another embodiment, the third certificate is a one-time use certificate. In another embodiment, the third certificate is a short-lived certificate. In another embodiment, the one-time use or short-lived certificate is generated on demand. In another embodiment, the one-time use or short-lived certificate is generated on demand by the authorizer. For example, suppose Major issued a long-lived certificate to E-Commerce and E-Commerce issued a long-lived certificate to Fly-By-Night, but E-Commerce also issued a short-lived or one-time use certificate to Fly-By-Night. This forces Fly-By-Night to go back to E-Commerce after a short time or one use to get another certificate, giving E-Commerce more control. The short-lived or one-time use certificate could be generated during the additional processing of step 6 of FIG. 4B and returned to the authorizer along with the first certificate in step 7. Short-lived and one-time use certificates give the client more control over the third party. In another embodiment, a secure channel is established with the authorizer in place of a one-time use certificate.

In another embodiment, when the authorizer accesses the URI, the client authenticates the authorizer. In another embodiment, the client limits the third party's use of the first certificate. In another embodiment, the client tracks the third party's use of the first certificate. In another embodiment, the contents of the first certificate are not revealed to the third party. In another embodiment, when the authorizer accesses the URI, the client does not provide the certificate when it is requested, effectively revoking the privilege. In another embodiment, the third party delegates part or all of its privileges to a fourth-party, so that the third party would be acting as the client in the methods of the present invention with respect to the fourth party.

As shown in FIG. 8, another aspect of the present invention is a machine-accessible medium having associated content capable of directing the machine to perform a method of assembling authorization certificate chains among an authorizer, a client, and a third party 800. In one embodiment, the associated content is a software development kit. The client receives a first certificate from the authorizer 802 and then generates a URI associated with both the at least one first certificate and the third party 804. The client provides a second certificate and the URI to the third party 806. After the third party provides the second certificate and URI to the authorizer 808, the authorizer accesses the URI 810 and, then, the client provides the first certificate to the authorizer 812. In one embodiment, the third party provides the second certificate and URI to the authorizer in an XML signature. In another embodiment, the first and second certificates are SPKI certificates. In another embodiment, the authorizer grants access to the third party. In another embodiment, the client tracks at least one use of the second certificate. In another embodiment the client revokes the second certificate.

In an example embodiment of the present invention, the client maintains a database of third parties to which it has issued authorization certificates. The database contains enough information to construct certificates and store them. Other information, such as the client's arrangement with each third party and information related to later processing is optionally included in the database. Each such certificate is identified by a certificate identification value (certID). The certID is scoped by the particular context of the client and third party, so it need not be globally unique. When the client issues a certificate to the third party, it also provides the third party with a URI string of the form URI_prefix#certID. For example, the third party may provide the URI string http://www.TheClient.com/SubDomain/SPKI/Auth1234#delegate5678. The URI can also contain information about the third party and other information to help the client web server later on when it processes the request for that URI. When the third party signs a SOAP request to send to the authorizer, it first includes its own SPKI certificate. For example, the third party includes its own SPKI certificate in an <SPKIData> element of the XML signature's <KeyInfo> element. To complete the authorization information for the signature, the third party also includes a <RetrievalMethod> element of the signature's <KeyInfo> with the URI value specified by the client. For example, <RetrievalMethod URI=http://www.TheClient.com/SubDomain/SPKI/Auth1234delegate5678/>.

When the authorizer receives the SOAP request, it extracts the SPKI certificate and also performs an HTTP Get operation on the RetrievalMethod's URI according to the XML signature specification. This operation invokes a web server belonging to the client and supplies the context in which to process the request. The client optionally performs any additional processing steps and then returns the SPKI certificate (s) issued to it by the authorizer. For example, the client performs additional processing to verify the status of its relationship with the third party, logs the date and time of the request, maintains a count of the number of such requests and other similar acts.

It is to be understood that the above description is intended to be illustrative, and not restrictive. Many other embodiments are possible and some will be apparent to those skilled in the art, upon reviewing the above description. For example various types of digital certificates may be used in place of SPKI certificates, languages other than XML may be used, communications other than SOAP requests may be used, Universal Resource Locators (URLs) may be used in place of URIs, Intranets, Local Area Networks (LANs) or other networks may be used in place of the Internet, and more. Therefore, the spirit and scope of the appended claims should not be limited to the above description. The scope of the invention should be determined with reference to the appended claims, along with the full scope of equivalents to which such claims are entitled.

What is claimed is:

1. A method performed by an authorizer, the method comprising:
   storing a first certificate in a data storage device;
   delivering a copy of the first certificate to a client over a network via a network interface device of the authorizer;
   receiving, over the network via the network interface device, a resource request from a third party, the resource request including a second certificate and a universal resource identifier (URI) to access the copy of the first certificate of the client; and
   attempting to access, over the network via the network interface device, the URI wherein a response to the URI access attempt indicates whether the third party resource request is to be granted, the response to the URI access attempt coming from the client and including the copy of the first certificate, wherein the copy of the first certificate is never received by the third party.

2. The method of claim 1, wherein the content of the first certificate is not revealed to the third party.

3. The method of claim 1, further comprising:
   fulfilling the third party resource request.

4. The method of claim 1, further comprising:
   ignoring the third party resource request when a response received in response to the URI access attempt indicates that the third party is not authorized.

5. The method of claim 1, wherein the first and second certificates are Simple Public Key Infrastructure (SPKI) certificates.

6. At least one non-transitory machine-accessible medium, with instructions stored thereon, which when executed by at least one processor of an authorizer, cause the authorizer to:
   store a first certificate;
   deliver a copy of the first certificate to a client;
   receive, over a network via a network interface device, a resource request from a third party, the resource request including a second certificate and a universal resource identifier (URI) to access the copy of the first certificate of the client; and
   attempt to access, over the network via the network interface device, the URI wherein a response to the URI access attempt indicates whether the third party resource request is to be granted, the response to the URI access attempt coming from the client and including the copy of the first certificate, wherein the copy of the first certificate is never received by the third party.

7. The at least one non-transitory machine-accessible medium of claim 6, wherein the content of the first certificate is not revealed to the third party.

8. The at least one non-transitory machine-accessible medium of claim 6, with further instructions stored thereon, which when executed by the at least one processor of the authorizer, further cause the authorizer to:
fulfill the third party resource request.

9. The at least one non-transitory machine-accessible medium of claim 6, with further instructions stored thereon, which when executed by the at least one processor of the authorizer, further cause the authorizer to:
ignore the third party resource request when a response received in response to the URI access attempt indicates that the third party is not authorized.

10. The at least one non-transitory machine-accessible medium of claim 6, wherein the first and second certificates are Simple Public Key Infrastructure (SPKI) certificates.

11. A method performed by an authorizer, the method comprising:
receiving, over a network via a network interface device of the authorizer, a resource request from a third party, the resource request including a second certificate and a universal resource identifier (URI) to access a first certificate of a client; and
attempting to access, over the network via the network interface device, the URI wherein a response to the URI access attempt indicates whether the third party resource request is to be granted, the response to the URI access attempt coming from the client and including a copy of the first certificate, wherein the copy of the first certificate is never received by the third party.

12. The method of claim 11, wherein the content of the first certificate is not revealed to the third party.

13. The method of claim 11, further comprising:
fulfilling the third party resource request.

14. The method of claim 11, further comprising:
ignoring the third party resource request when a response received in response to the URI access attempt indicates that the third party is not authorized.

15. The method of claim 11, wherein the first and second certificates are Simple Public Key Infrastructure (SPKI) certificates.

16. An apparatus comprising:
a processor;
a memory device;
a network interface device; and
instructions stored in the memory device and executable by the processor to:
store a first certificate;
deliver a copy of the first certificate to a client;
receive, over a network via the network interface device, a resource request from a third party, the resource request including a second certificate and a universal resource identifier (URI) to access the copy of the first certificate of the client; and
attempt to access, over the network via the network interface device, the URI wherein a response to the URI access attempt indicates whether the third party resource request is to be granted, the response to the URI access attempt coming from the client and including the copy of the first certificate, wherein the copy of the first certificate is never received by the third party.

17. The apparatus of claim 16, wherein the content of the first certificate is not revealed to the third party.

18. The apparatus of claim 16, with further instructions stored in the memory device, which when executed by the processor, further cause the apparatus to:
fulfill the third party resource request.

19. The apparatus of claim 16, with further instructions stored in the memory device, which when executed by the processor, further cause the apparatus to:
ignore the third party resource request when a response received in response to the URI access attempt indicates that the third party is not authorized.

20. The apparatus of claim 16, wherein the first and second certificates are Simple Public Key Infrastructure (SPKI) certificates.

* * * * *